(12) United States Patent
Eide

(10) Patent No.: US 9,339,159 B2
(45) Date of Patent: May 17, 2016

(54) VACUUM BRUSH DRIVE

(71) Applicant: AERUS LLC, Dallas, TX (US)

(72) Inventor: Andrew Eide, Rockwall, TX (US)

(73) Assignee: AERUS LLC, Dallas, TX (US)

( * ) Notice: Subject to any disclaimer, the term of this patent is extended or adjusted under 35 U.S.C. 154(b) by 0 days.

(21) Appl. No.: 14/304,576

(22) Filed: Jun. 13, 2014

(65) Prior Publication Data

US 2015/0359395 A1 Dec. 17, 2015

(51) Int. Cl.
*A47L 9/04* (2006.01)
*A47L 5/30* (2006.01)

(52) U.S. Cl.
CPC ............... *A47L 5/30* (2013.01); *A47L 9/0444* (2013.01); *A47L 9/0433* (2013.01)

(58) Field of Classification Search
CPC ........ A47L 5/30; A47L 9/0433; A47L 9/0444

USPC ............................................. 15/389
IPC .......................................... A47L 9/04
See application file for complete search history.

(56) References Cited

U.S. PATENT DOCUMENTS

| | | |
|---|---|---|
| 3,200,433 A | 8/1965 | Downey |
| 3,266,078 A | 8/1966 | Brown et al. |
| 3,567,637 A | 3/1971 | Sabol |
| 4,976,003 A | 12/1990 | Williams |
| 6,406,514 B1 | 6/2002 | Vystreil et al. |
| 6,934,993 B1 | 8/2005 | Huffman et al. |
| 7,007,336 B2 | 3/2006 | Roney et al. |
| 8,347,456 B2 | 1/2013 | Sweeby et al. |
| 2011/0214248 A1 | 9/2011 | Mcleod et al. |

*Primary Examiner* — David Redding
(74) *Attorney, Agent, or Firm* — Howison & Arnott, LLP

(57) ABSTRACT

A vacuum cleaner is described, the vacuum cleaner having a vacuum head with a housing, a suction port, a motor, and a brush. The brush is connected to a drive pulley, the motor has a motor pinion, and a belt extends from the motor pinion to the drive pulley the belt having teeth with a rounded profile.

6 Claims, 4 Drawing Sheets

VACUUM BRUSH DRIVE

BACKGROUND

1. Field of the Invention

The present invention relates generally to powered brushes associated with vacuum cleaners.

2. Description of Related Art

Vacuum cleaners come in a variety of forms, generally upright or canister. Powered brushes are found on most modern upright vacuums and many canister vacuums have powered heads that include a driven brush. The driven brush can be important in lifting debris off of a surface so that it may be sucked into the vacuum cleaner, as opposed to just staying attached to the surface being cleaned.

Vacuum cleaners are known to have a problem with being loud. Excessive noise can be irritating to the operator of the vacuum and others in proximity. Therefore some manufacturers have worked to reduce the noise of then vacuum units. As they have reduced the noise of the motor and suction aspects of the vacuum the noise created by the brush drive has become more noticeable. Brush drive systems typically us belts rather than chains or gears. These belts are typically simple square toothed belts because such belts ensure that the brush is spinning at the designed speed without slippage, but the loads are well within the torque limits for such belts. These square toothed belts are reasonably quiet, but their noise is more noticeable with a modern vacuum cleaner.

A need exists, therefore, for a quieter brush drive for use with vacuum cleaners, but without diminishing the performance of the powered brush.

All references cited herein are incorporated by reference to the maximum extent allowable by law. To the extent a reference may not be fully incorporated herein, it is incorporated by reference for background purposes and indicative of the knowledge of one of ordinary skill in the art.

BRIEF SUMMARY OF THE INVENTION

The problems presented in typical vacuum cleaner brush drive system are solved by providing a drive system for the vacuum brush that uses a drive belt with rounded teeth.

A vacuum cleaner is described, the vacuum cleaner having a vacuum head with a housing, a suction port, a motor, and a brush. The brush is connected to a drive pulley, the motor has a motor pinion, and a belt extends from the motor pinion to the drive pulley, the belt having teeth with a rounded profile.

Other objects, features, and advantages of the present invention will become apparent with reference to the drawings and detailed description that follow.

DETAILED DESCRIPTION OF THE PREFERRED EMBODIMENT

All references cited herein are incorporated by reference to the maximum extent allowable by law. To the extent a reference may not be fully incorporated herein, it is incorporated by reference for background purposes and indicative of the knowledge of one of ordinary skill in the art.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
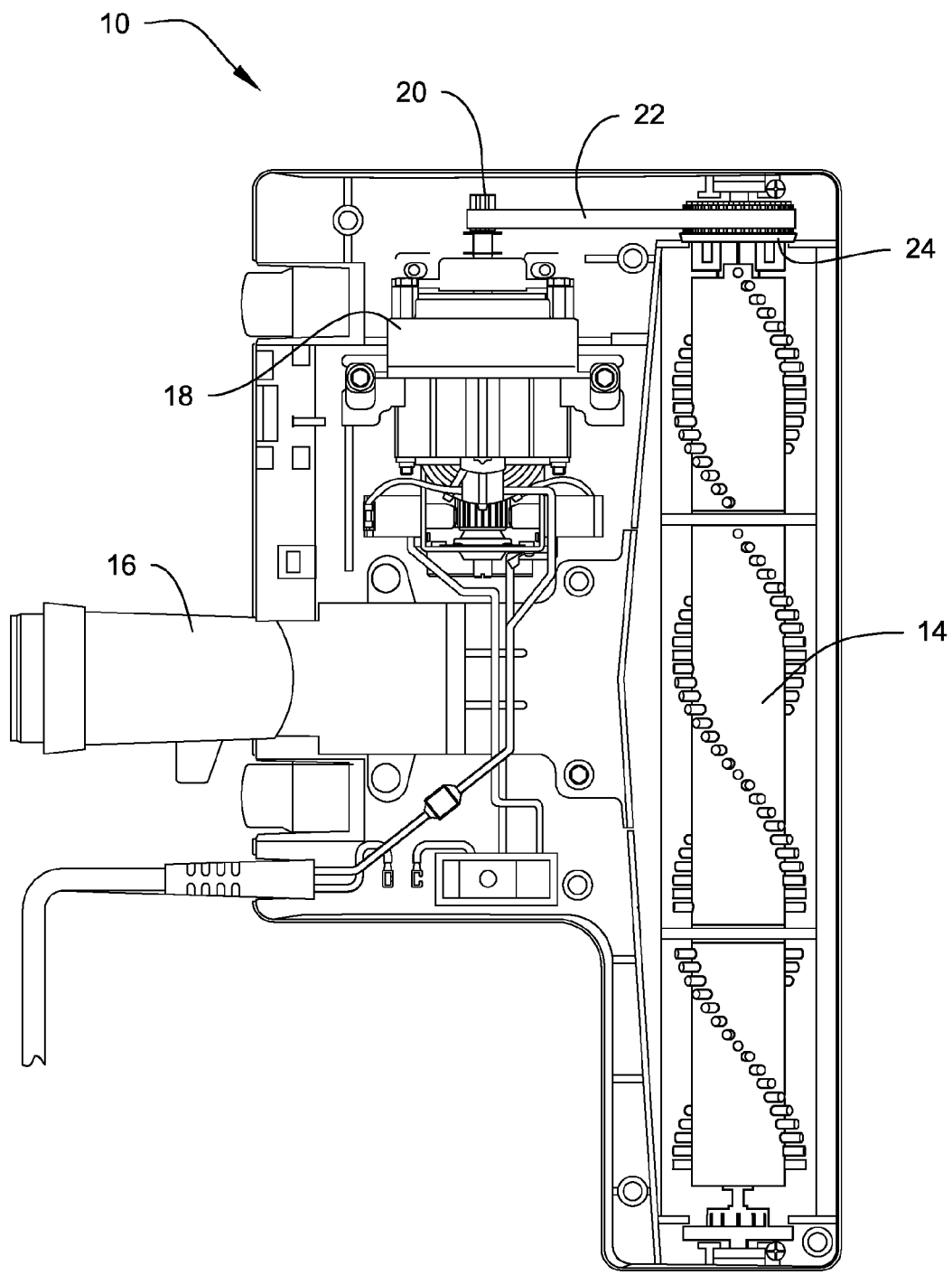
FIG. 1 is plan view of a vacuum cleaner head with a top portion of the vacuum cleaner head housing removed.

FIG. 1 is plan view of a vacuum cleaner head 10 with a top portion of the vacuum cleaner head housing 12 removed. The housing 12 contains a brush 14 and a suction port 16 leads to as suction unit (not shown). The housing 12 of this embodiment is configured as a powered head for a canister type vacuum cleaner. A drive motor 18 is connected to brush 14 by a motor pinion 20 that drives a belt 22 attached to both the motor pinion 20 and the brush drive pulley 24. Motor 18 spins pinion 20, which in turn rotates belt 22, which drives pulley 24, which is attached to brush 14. It is difficult to determine the profile of the belt 22 from this view.

Figure 2:
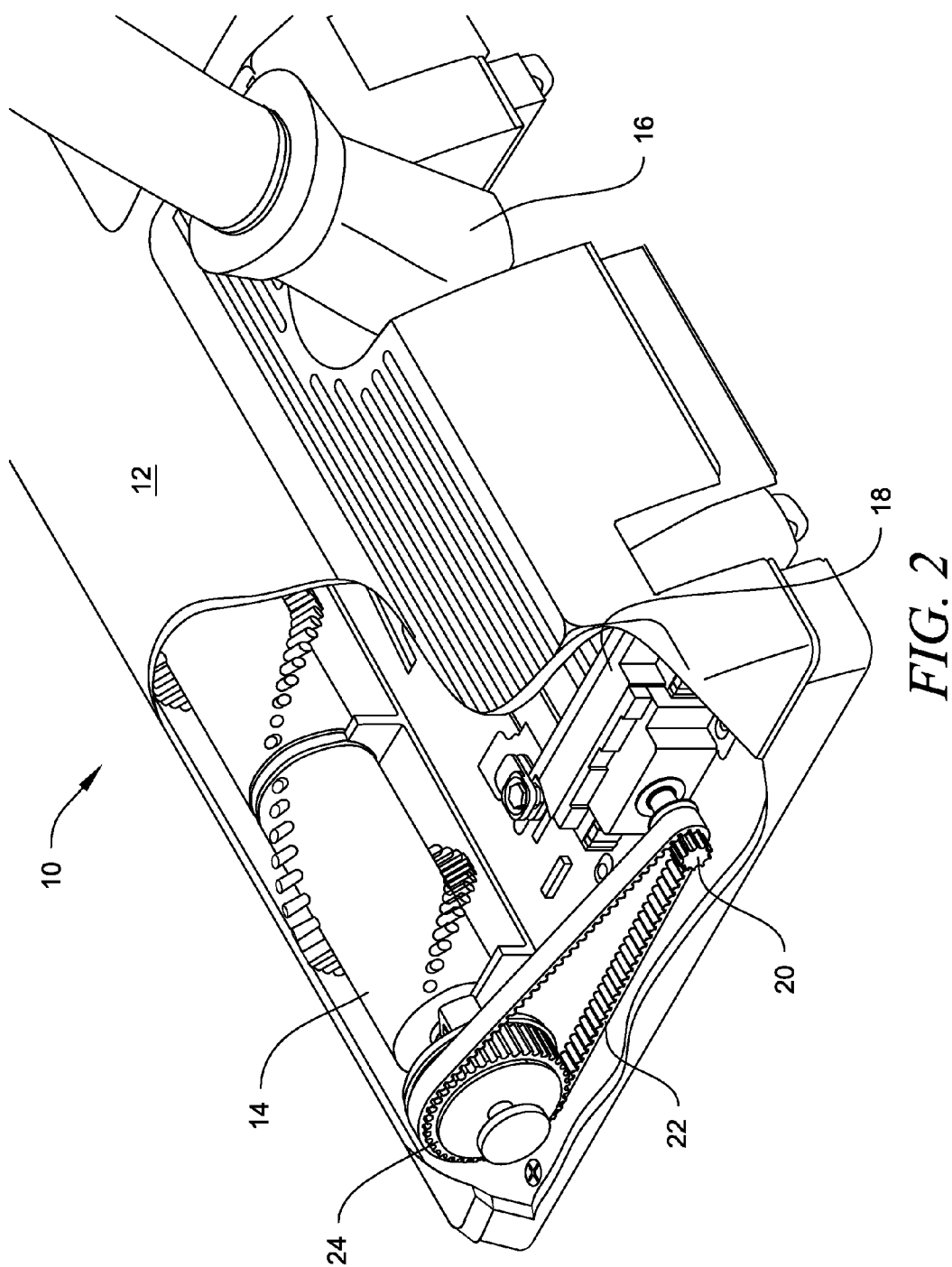
FIG. 2 is a perspective sectional view of a vacuum cleaner head showing the arrangement of a brush drive system.

FIG. 2 is a perspective sectional view of a vacuum cleaner head 10 showing the arrangement of a brush drive system. Housing 12 is shown in partial section to reveal the components bring discussed. Motor 18 is partially shown, while the arrangement of pinion 20, belt 22 and pulley 24 is more clearly shown in relation to brush 24. From this view the profile of belt 22 is almost discernable.

Figure 3:
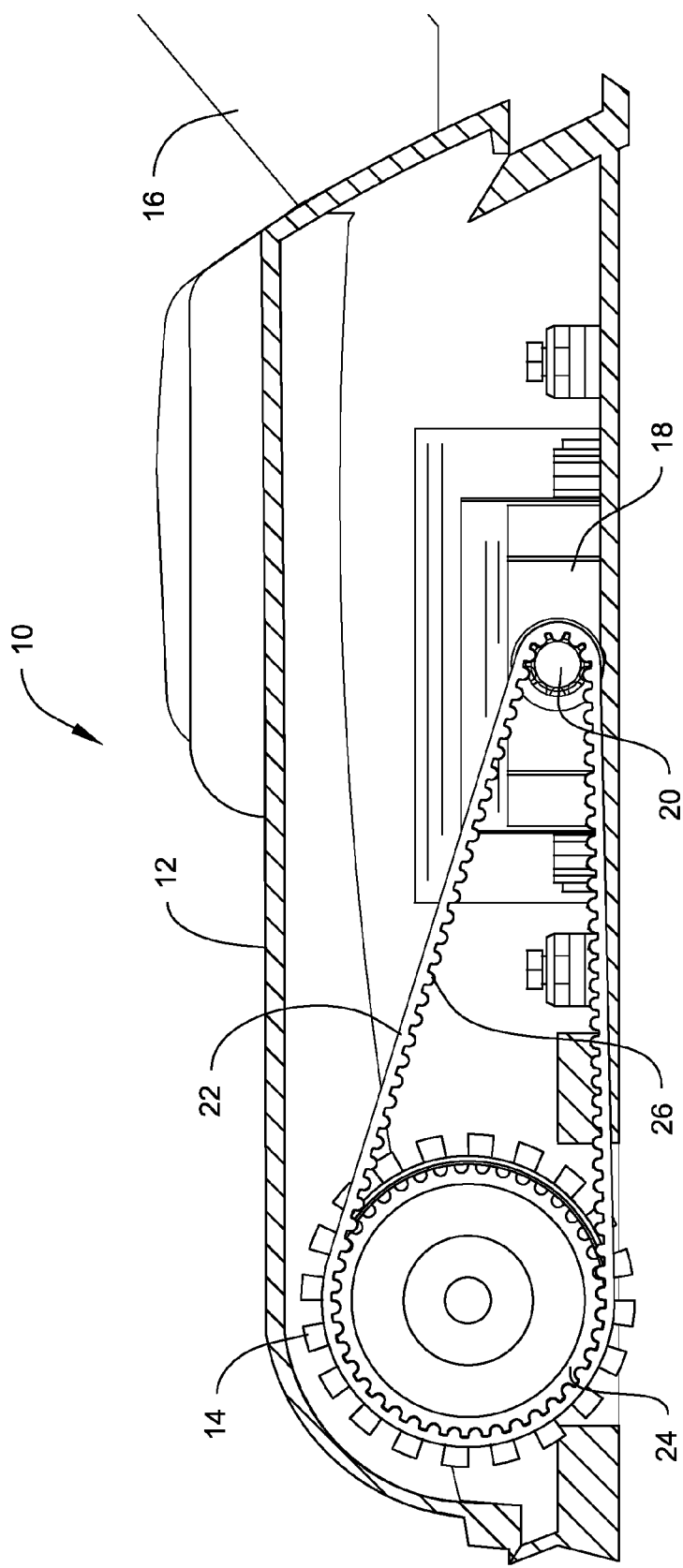
FIG. 3 is a side sectional view of a vacuum cleaner head.

FIG. 3 is to side sectional view of a vacuum cleaner head 10 giving another perspective on the layout of motor 18, pinion 20, belt 22, drive pulley 24 and brush 14. From this view belt 22 clearly has teeth 26 that have a rounded profile. The belt 22 has rounded teeth 26. The rounded teeth have a pitch, spacing from peak to peak, in the range of 0.300 to 0.005 inches, with as typical pitch being about 0.120, such as a Gates #T31-048-0118H which has a pitch of 0.118 inches.

Figure 4:
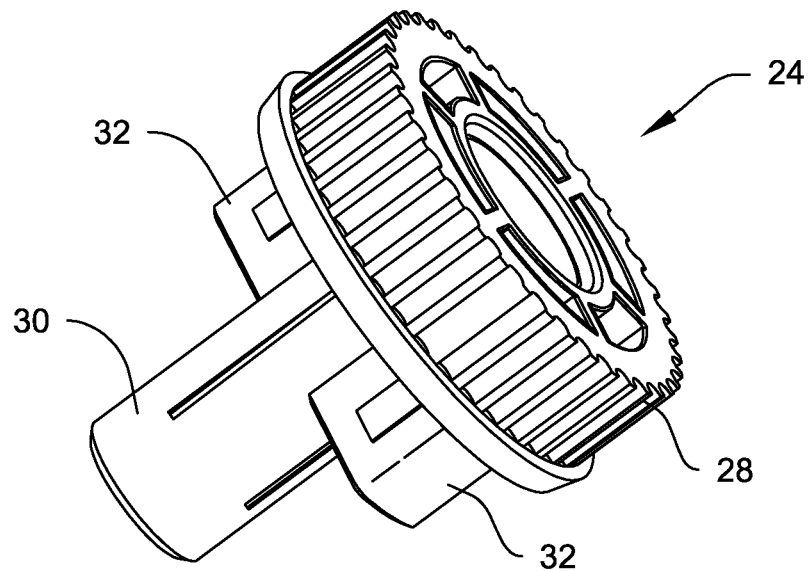
FIG. 4 is a perspective view of a drive pulley.

FIG. 4 is a perspective view of a drive pulley 24 showing a concave profile 28 to match the rounded teeth 26 of the belt 22. Pulley 24 also has a spindle 30 and wings 32 to engage brush 14.

Figure 5:
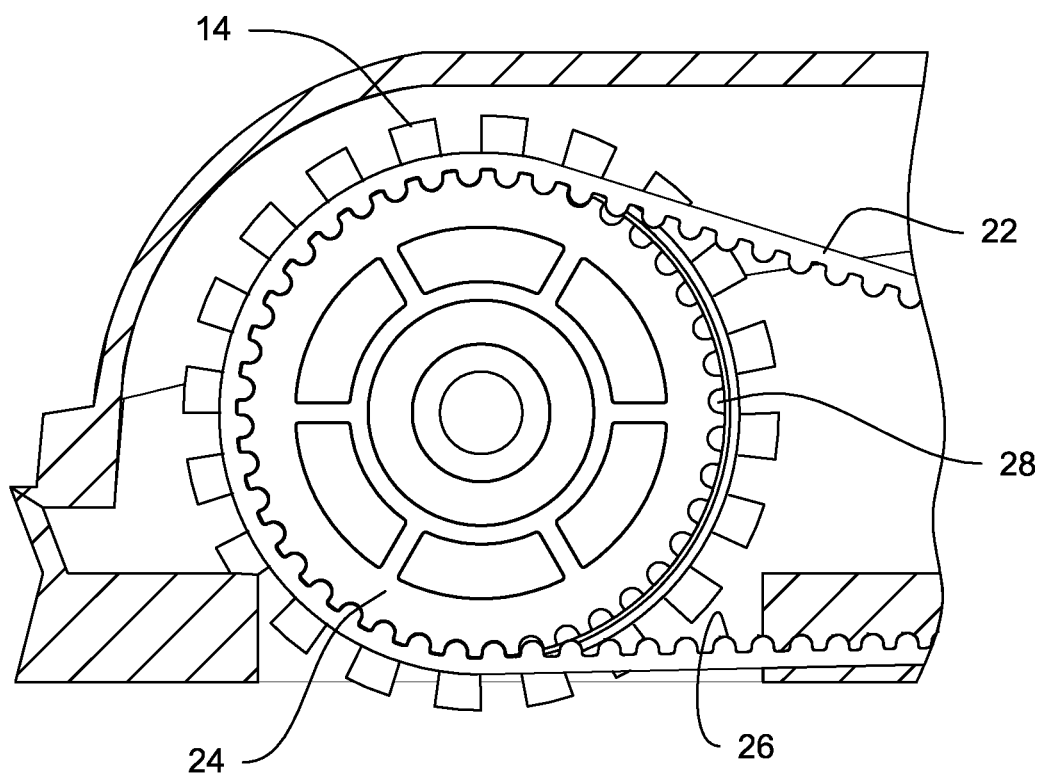
FIG. 5 is a close up sectional side view of a vacuum cleaner bead.

FIG. 5 is a side view of the drive pulley 24 and belt 22. Rounded teeth 26 and concave profile 28 are clearly shown in relation to each other. As the teeth 26 of the belt engage with the profile 28 there is little flexing or interference between the two due to the rounded shape. This shape was first designed to reduce the stress on belt teeth and increase the loads that toothed belts could carry. Here the present invention uses this profile not to increase loads, but to reduce noise.

Even though the embodiment shown in this application is in a powered head of a canister type vacuum cleaner, the same drive system can be applied to other vacuum cleaner brush drives to reduce the noise generated by the belt drive system.

It should be apparent from the foregoing that an invention having significant advantages has been provided. While the invention is shown in only a few of its forms, it is not just limited but is susceptible to various changes and modifications without departing from the spirit thereof.

I claim:

1. A vacuum cleaner comprising:

vacuum head having a housing, as suction port, a motor, and a brush;

the brush being connected to a drive pulley;

the motor having as motor pinion;

a belt extending from the motor pinion to the drive pulley, the belt having teeth with a rounded profile and a pitch in the range of 0.300 inches and 0.050 inches.

2. The vacuum cleaner of claim 1 wherein:

the rounded teeth of the belt have as pitch of about 0.12 inches.

3. The vacuum cleaner of claim 1 wherein:

the drive pulley has a concave profile.

4. A brush drive system comprising:

a motor;

a motor pinion connected to the motor;

a belt connected to the motor pinion, the belt having, teeth with a rounded profile and a pitch in the range of 0.300 inches and 0.050 inches;

a brush drive pulley connected to the belt, the drive pulley having a concave profile that matches the rounded tooth profile of the belt;

a vacuum cleaner brush driven by the brush drive pulley.

5. The brush drive system of claim 4 wherein:

the rounded teeth of the belt have a pitch of about 0.12 inches.

6. The brush drive system of claim 4 wherein:

the drive pulley has a concave profile.

* * * * *